United States Patent
Ishizu (10) Patent No.: US 11,137,958 B2
(45) Date of Patent: Oct. 5, 2021

(54) ELECTRONIC APPARATUS, METHOD OF CONTROLLING ELECTRONIC APPARATUS, AND NON-TRANSITORY COMPUTER READABLE RECORDING MEDIUM

(71) Applicant: KYOCERA DOCUMENT SOLUTIONS INC., Osaka (JP)

(72) Inventor: Ryuichi Ishizu, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 8 days.

(21) Appl. No.: 16/789,549

(22) Filed: Feb. 13, 2020

(65) Prior Publication Data

US 2020/0264819 A1 Aug. 20, 2020

(30) Foreign Application Priority Data

Feb. 15, 2019 (JP) .............................. JP2019-025909

(51) Int. Cl.
- *G06F 15/00* (2006.01)
- *G06F 1/00* (2006.01)
- *G06K 15/00* (2006.01)
- *G06F 3/12* (2006.01)
- *H04L 29/06* (2006.01)
- *H04L 29/08* (2006.01)

(52) U.S. Cl.
CPC ............ *G06F 3/1232* (2013.01); *G06F 3/121* (2013.01); *G06F 3/1236* (2013.01); *H04L 67/42* (2013.01); *H04L 69/18* (2013.01); *G06F 3/1288* (2013.01); *H04L 67/02* (2013.01)

(58) Field of Classification Search
CPC ...... G06F 3/1232; G06F 3/121; G06F 3/1236; G06F 3/1288; H04L 67/42; H04L 67/02; H04L 69/18

USPC ............................... 358/1.15, 1.13, 1.14, 1.1
See application file for complete search history.

(56) References Cited

U.S. PATENT DOCUMENTS

| 9,798,503 B2* | 10/2017 | Zakharov .............. G06F 3/1288 |
| 2006/0045124 A1* | 3/2006 | Dahlstrom .......... H04L 63/0245 370/465 |
| 2009/0213843 A1* | 8/2009 | Chattopadhya ..... H04M 7/0069 370/352 |

FOREIGN PATENT DOCUMENTS

| JP | 2008294739 A | 12/2008 |
| JP | 2016052004 A | 4/2016 |

* cited by examiner

*Primary Examiner* — Douglas Q Tran
(74) *Attorney, Agent, or Firm* — Li & Cai Intellectual Property (USA) Office (57) ABSTRACT

An electronic apparatus includes: a communication interface configured to communicate with a server apparatus based on one of a first communication protocol and a second communication protocol; and a controller circuit configured to control the communication interface to start communication with the server apparatus based on the first communication protocol, and to confirm whether or not the server apparatus has a schedule of execution of remote maintenance after start of the communication, if the communication interface receives remote maintenance execution schedule information from the server apparatus, control the communication interface to start communication with the server apparatus based on the second communication protocol, and execute the remote maintenance based on information received from the server apparatus via the communication based on the second communication protocol.

7 Claims, 8 Drawing Sheets

| RM identifier | Execution scheduled time | Immediate execution flag | Procedure |
|---|---|---|---|
| ... | ... | ... | ... |
| ... | ... | ... | ... |
| ... | ... | ... | ... |

ELECTRONIC APPARATUS, METHOD OF CONTROLLING ELECTRONIC APPARATUS, AND NON-TRANSITORY COMPUTER READABLE RECORDING MEDIUM

CROSS-REFERENCE TO RELATED PATENT APPLICATION

This application claims the benefit of Japanese Priority Patent Application JP 2019-025909 filed Feb. 15, 2019, the entire contents of which are incorporated herein by reference.

FIELD OF THE DISCLOSURE

The present disclosure relates to an electronic apparatus. The present disclosure further relates a method of controlling an electronic apparatus executable by a controller circuit of the electronic apparatus. The present disclosure further relates a non-transitory computer readable recording medium that records a controller program executable by a controller circuit of an electronic apparatus.

BACKGROUND OF THE DISCLOSURE

There is known a remote maintenance system for remotely maintaining electronic apparatuses (for example, devices such as image forming apparatuses).

SUMMARY OF THE DISCLOSURE

In a remote maintenance system that uses two or more communication protocols, it is desirable for an electronic apparatus, which is configured in principle not to use a different communication protocol other than one communication protocol, to execute remote maintenance using the different communication protocol.

According to an embodiment of the present disclosure, there is provided an electronic apparatus, including:
a communication interface configured to communicate with a server apparatus based on one of a first communication protocol and a second communication protocol; and
a controller circuit configured to
control the communication interface to start communication with the server apparatus based on the first communication protocol, and to confirm whether or not the server apparatus has a schedule of execution of remote maintenance after start of the communication,
if the communication interface receives remote maintenance execution schedule information from the server apparatus, control the communication interface to start communication with the server apparatus based on the second communication protocol, and
execute the remote maintenance based on information received from the server apparatus via the communication based on the second communication protocol.

According to an embodiment of the present disclosure, there is provided a method of controlling an electronic apparatus, including:
controlling a communication interface to start communication with a server apparatus based on a first communication protocol, and to confirm whether or not the server apparatus has a schedule of execution of remote maintenance after start of the communication;
if the communication interface receives remote maintenance execution schedule information from the server apparatus, controlling the communication interface to start communication with the server apparatus based on a second communication protocol; and
executing the remote maintenance based on information received from the server apparatus via the communication based on the second communication protocol.

According to an embodiment of the present disclosure, there is provided a non-transitory computer readable recording medium that records a controller program executable by a controller circuit of an electronic apparatus including a communication interface and the controller circuit, the controller program causing the controller circuit of the electronic apparatus to:
control the communication interface to start communication with a server apparatus based on a first communication protocol, and to confirm whether or not the server apparatus has a schedule of execution of remote maintenance after start of the communication;
if the communication interface receives remote maintenance execution schedule information from the server apparatus, control the communication interface to start communication with the server apparatus based on a second communication protocol; and
execute the remote maintenance based on information received from the server apparatus via the communication based on the second communication protocol.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Hereinafter, an embodiment of the present disclosure will be described with reference to the drawings.

1. REMOTE MAINTENANCE SYSTEM

Figure 1:
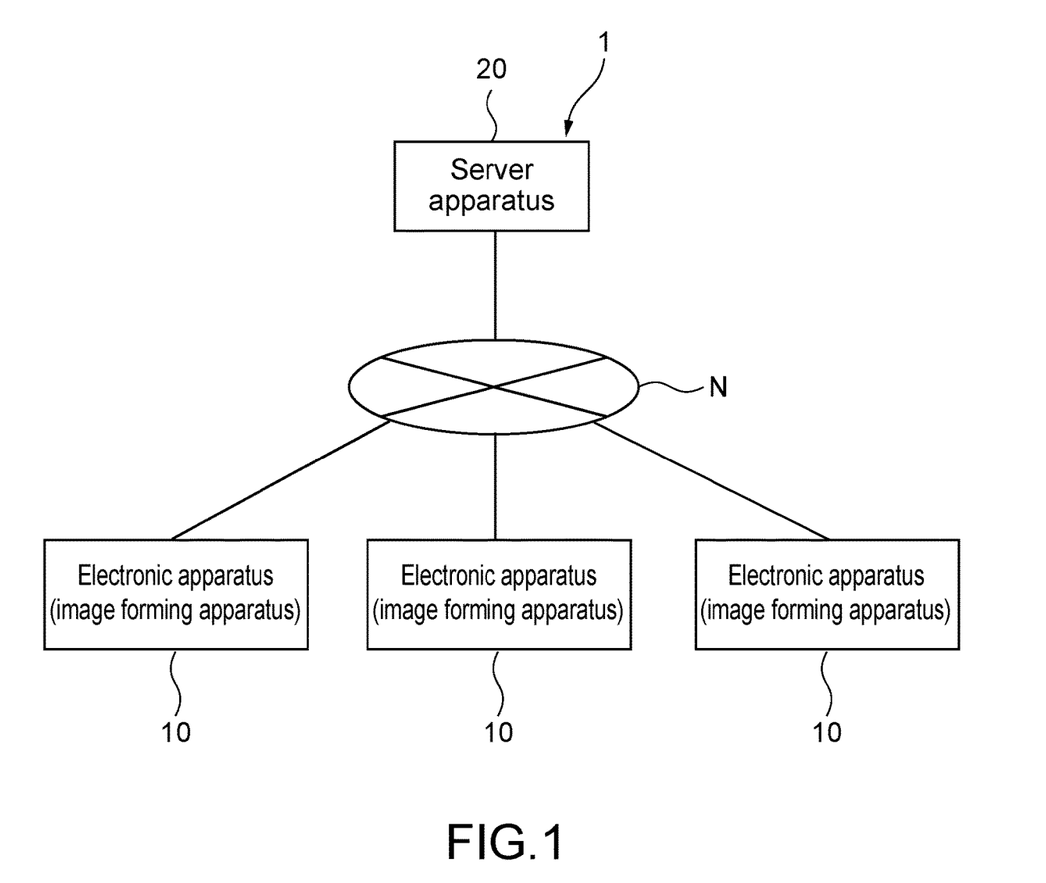
FIG. 1 shows a remote maintenance system according to an embodiment of the present disclosure.

FIG. 1 shows a remote maintenance system according to an embodiment of the present disclosure.

The remote maintenance system 1 includes the multiple electronic apparatuses 10 and the server apparatus 20. The multiple electronic apparatuses 10 are communicably connected to the server apparatus 20 via the network N. The multiple electronic apparatuses 10 are clients for the server apparatus 20 in the remote maintenance system 1.

The multiple electronic apparatuses 10 are, for example, image forming apparatuses (for example, Multifunction Peripherals, MFPs). In the following description, the single electronic apparatus 10 will be described where it is not necessary to distinguish between the multiple electronic apparatuses 10.

The server apparatus 20 remotely maintains and checks the multiple electronic apparatuses 10 for maintenance. The maintenance and check include, for example, to receive notification of the device status of the electronic apparatus 10 such as the number of output sheets or toner levels. The remote maintenance includes, for example, firmware upgrade execution and execution of various programs in a maintenance mode.

2. HARDWARE CONFIGURATION OF ELECTRONIC APPARATUS

Figure 2:
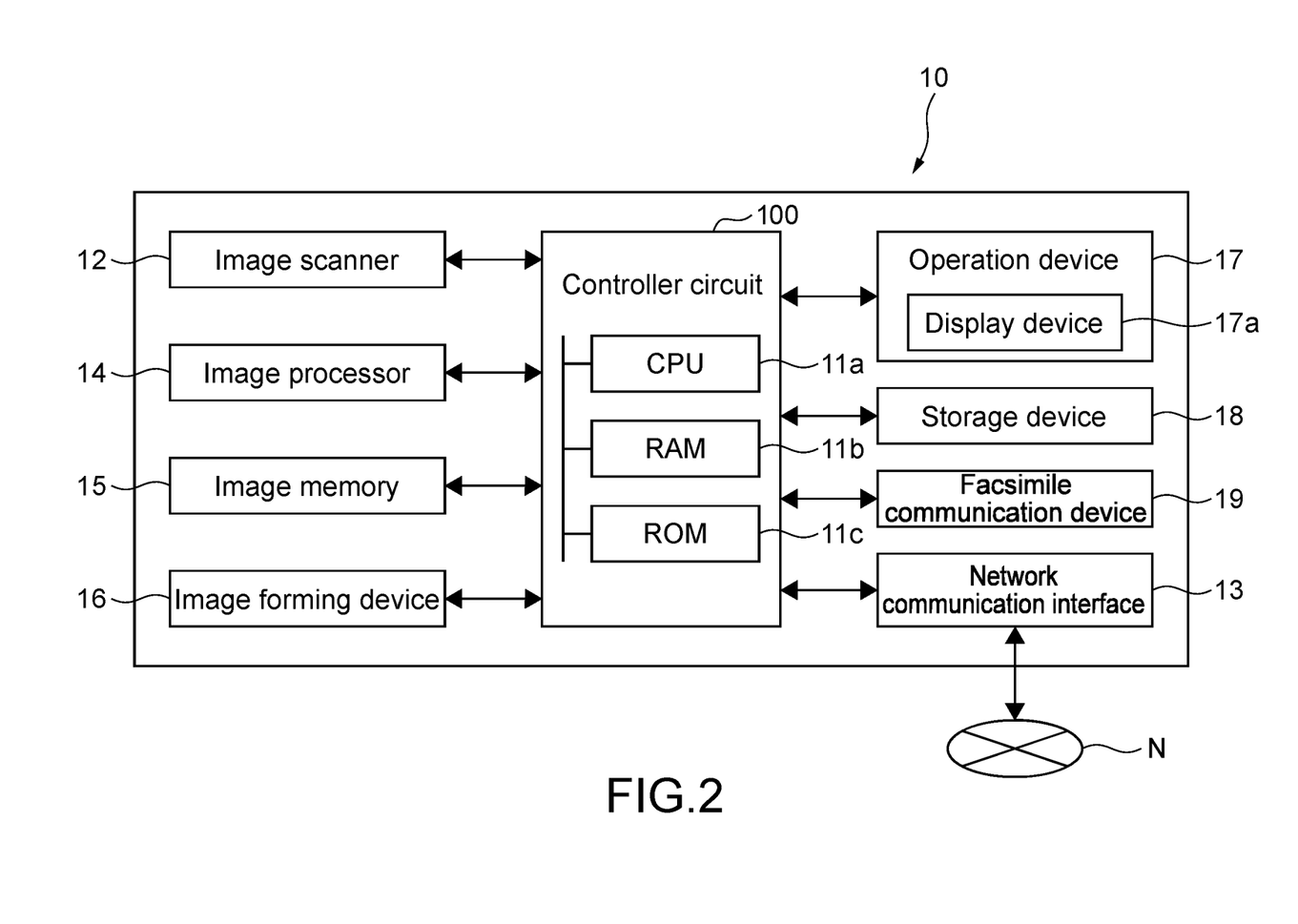
FIG. 2 shows a hardware configuration of an electronic apparatus.

FIG. 2 shows a hardware configuration of an electronic apparatus.

The electronic apparatus 10 includes the controller circuit 100. The controller circuit 100 includes the CPU (Central Processing Unit) 11a, the RAM (Random Access Memory) 11b, the ROM (Read Only Memory) 11c, dedicated hardware circuits, and the like and performs overall operational control of the electronic apparatus 10. The CPU 11a loads information processing programs stored in the ROM 11c in the RAM 11b and executes the information processing programs. The ROM 11c is a nonvolatile memory that stores programs executed by the CPU 11a, data, and the like. The ROM 11c is an example of a non-transitory computer readable recording medium.

The controller circuit 100 is connected to the image scanner 12, the image processor 14 (including GPU (Graphics Processing Unit)), the image memory 15, the image forming device 16 (printer), the operation device 17 including the display device 17a (touch panel), the large volume nonvolatile storage device 18 such as an HDD (Hard Disk Drive) or an SSD (Solid State Drive), the facsimile communication device 19, the network communication interface 13, and the like. The controller circuit 100 performs operational control of the respective devices connected thereto and sends/receives signals and data to/from those devices. The operation device 17 (touch panel) is one mode of an input device. A sound input device including a microphone may be provided as an input device.

The network communication interface 13 supports at least two protocol types, and communicates with nodes in the network based on those protocols. In the present embodiment, the controller circuit 100 controls the network communication interface 13 to execute communication based on HTTP (Hyper Text Transfer Protocol) and XMPP (Extensible Messaging and Presence Protocol).

The communication based on HTTP (HTTP communication) is used to communicate the device status of the electronic apparatus 10 such as the number of output sheets or toner levels. The communication based on XMPP (XMPP communication) is used to send and receive communication necessary for remote maintenance execution processing to and from the server apparatus 20.

In the XMPP communication, the connection status between the electronic apparatus 10 and the server apparatus 20 is maintained. So the electronic apparatus 10 has configuration called "monitor mode" to reduce the communication data volume. In the "monitor mode", the XMPP communication is disconnected, and the electronic apparatus 10 only executes device status notification via the HTTP communication. Hereinafter, the electronic apparatus 10 operates in the "monitor mode".

3. HARDWARE CONFIGURATION OF SERVER APPARATUS

Figure 3:
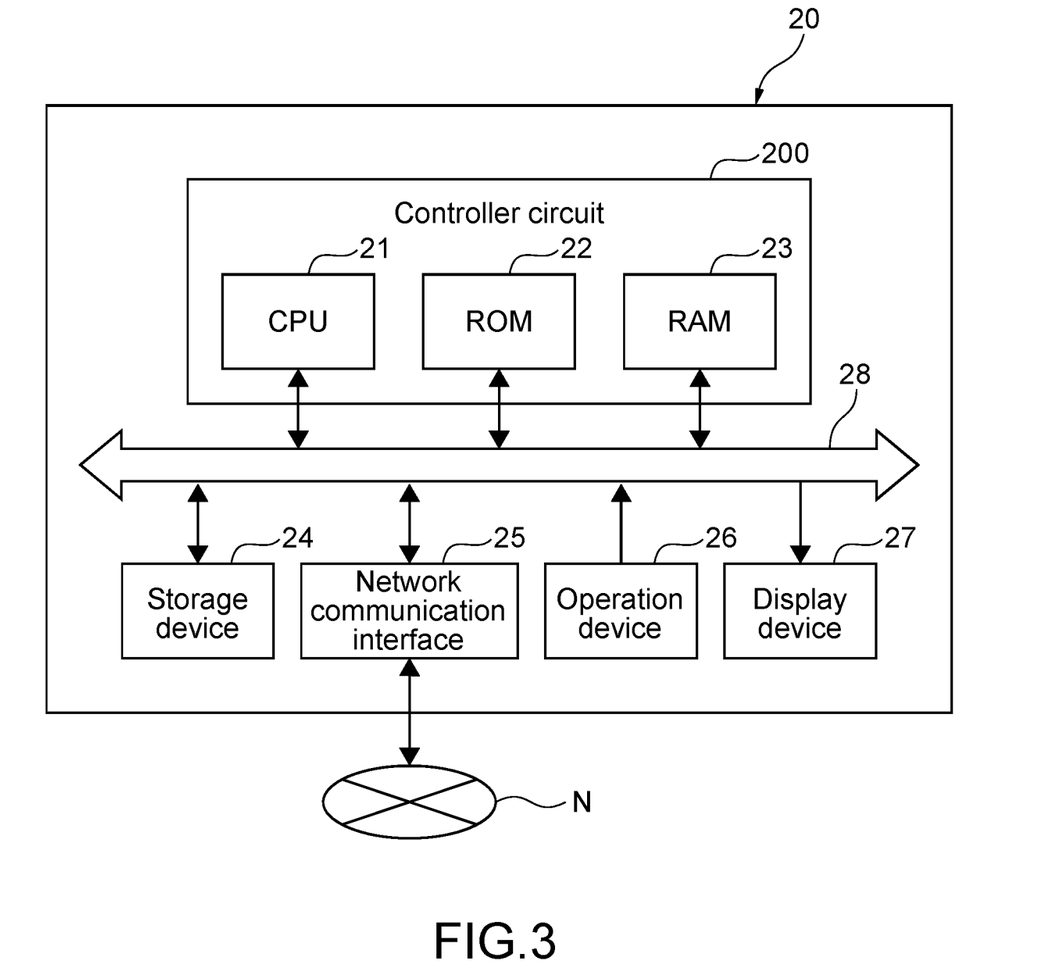
FIG. 3 shows a hardware configuration of a server apparatus.

FIG. 3 shows a hardware configuration of a server apparatus.

The server apparatus 20 includes the CPU 21, the ROM 22, the RAM 23, the storage device 24, which is a large-volume nonvolatile memory such as an HDD or an SSD, the network communication interface 25, the operation device 26, and the display device 27, and the bus 28 connecting them to each other.

The controller circuit 200 includes the CPU 21, the ROM 22, and the RAM 23. The CPU 21 loads information processing programs stored in the ROM 22 in the RAM 23 and executes the information processing programs. The ROM 22 stores programs executed by the CPU 21, data, and the like nonvolatile. The ROM 22 is an example of a non-transitory computer readable recording medium.

Similar to the network communication interface 13 of the electronic apparatus 10 described above, the network communication interface 25 supports HTTP and XMPP.

4. FUNCTIONAL CONFIGURATION OF REMOTE MAINTENANCE SYSTEM

Figure 4:
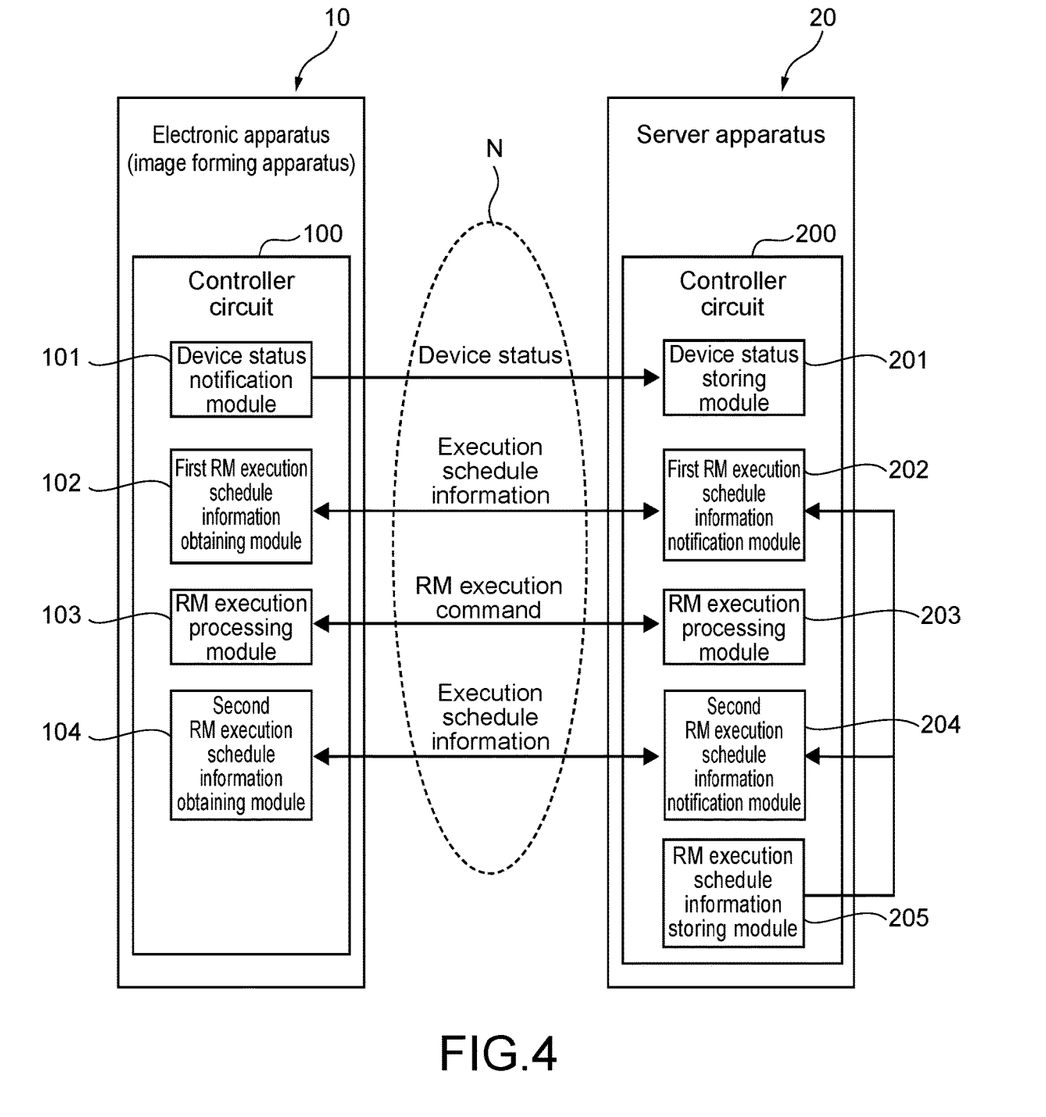
FIG. 4 shows a functional configuration of the remote maintenance system.

FIG. 4 shows a functional configuration of the remote maintenance system.

In the controller circuit 100 of the electronic apparatus 10, the CPU 11a loads an information processing program stored in the ROM 11c in the RAM 11b and executes the information processing program to operate as the device status notification module 101, the first remote maintenance execution schedule information obtaining module 102, the remote maintenance execution processing module 103, and the second remote maintenance execution schedule information obtaining module 104.

In the controller circuit 200 of the server apparatus 20, the CPU 21 loads an information processing program stored in the ROM 22 in the RAM 23 and executes the information processing program to operate as the device status storing module 201, the first remote maintenance execution schedule information notification module 202, the remote maintenance execution processing module 203, the second remote maintenance execution schedule information notification module 204, and the remote maintenance execution schedule information storing module 205.

The remote maintenance execution schedule information storing module 205 stores remote maintenance execution schedule information executed by the electronic apparatus 10 and the server apparatus 20.

5. EXAMPLE OF STRUCTURE OF EXECUTION SCHEDULE INFORMATION

Figure 5:
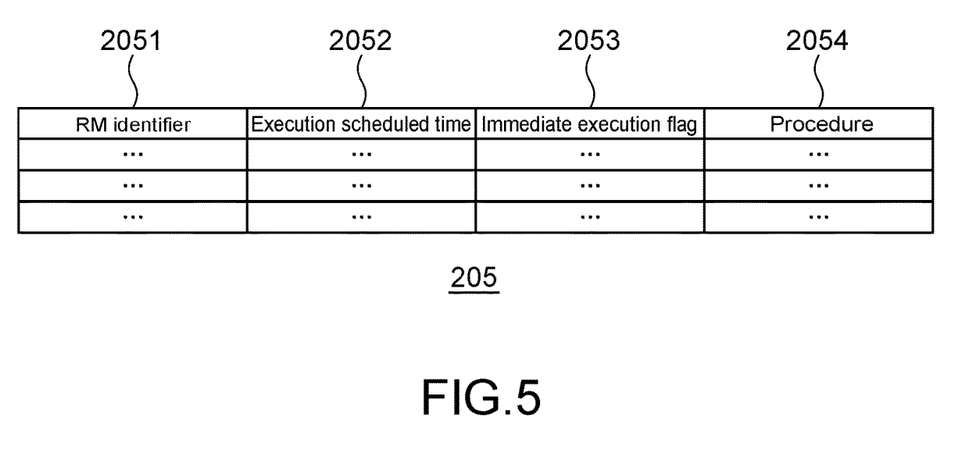
FIG. 5 shows an example of a structure of execution schedule information.

FIG. 5 shows an example of a structure of execution schedule information.

The remote maintenance execution schedule information storing module 205 has, for each remote maintenance execution schedule of one electronic apparatus 10, the remote maintenance identifier 2051, the execution scheduled time 2052, the immediate execution flag 2053, and the procedure 2054.

The remote maintenance execution schedule information storing module 205 stores remote maintenance execution schedule for each of the multiple electronic apparatuses 10. So the remote maintenance execution schedule information storing module 205 has multiple batches of remote maintenance execution schedules for one electronic apparatus 10 of FIG. 5.

The remote maintenance identifier 2051 is unique information for each remote maintenance execution schedule. The functional blocks of the controller circuit 100 and the controller circuit 200 identify each remote maintenance execution schedule based on the remote maintenance identifier 2051.

The execution scheduled time 2052 is information specifying remote maintenance execution scheduled time. The execution scheduled time 2052 having a format of, for example, "YYYYMMDDhhmm" is stored in the remote maintenance execution schedule information storing module 205. If remote maintenance is to be immediately executed, the execution scheduled time 2052 is not specified.

The immediate execution flag 2053 is information indicating that remote maintenance is to be immediately executed. The functional blocks of the controller circuit 100 and the controller circuit 200 determine whether or not remote maintenance is to be immediately executed based on the immediate execution flag 2053. If remote maintenance is not to be immediately executed, the immediate execution flag 2053 is not specified.

The procedure 2054 is information indicating procedure of processing executed by the remote maintenance execution processing module 103 and the remote maintenance execution processing module 203. The remote maintenance execution processing module 103 and the remote maintenance execution processing module 203 executes remote maintenance based on the procedure 2054.

After completion of remote maintenance execution processing, the remote maintenance execution schedule information storing module 205 abandons information of the executed remote maintenance.

6. OPERATIONAL FLOW OF ELECTRONIC APPARATUS

Figure 6:
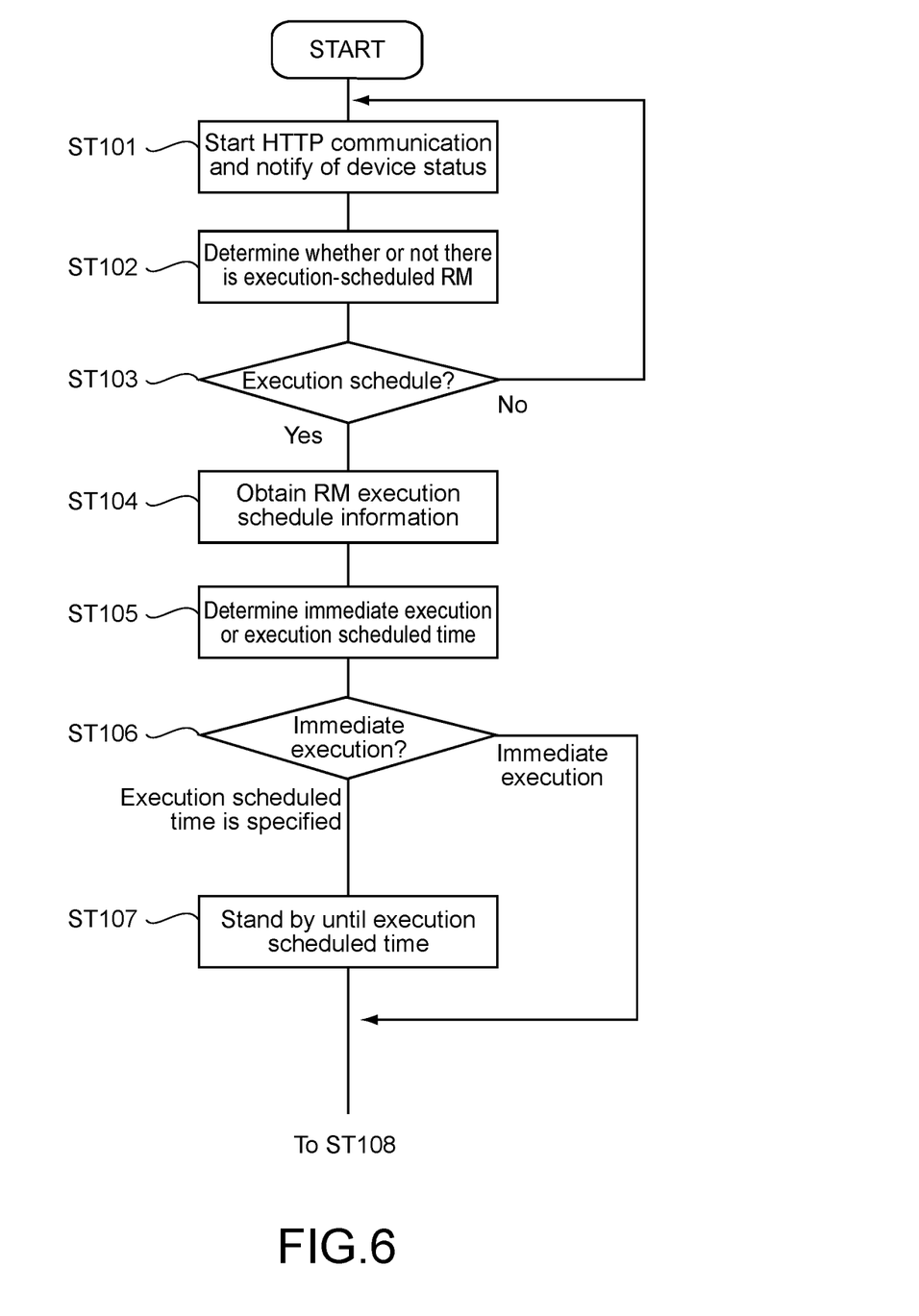
FIG. 6 shows an operational flow of the electronic apparatus.
Figure 7:
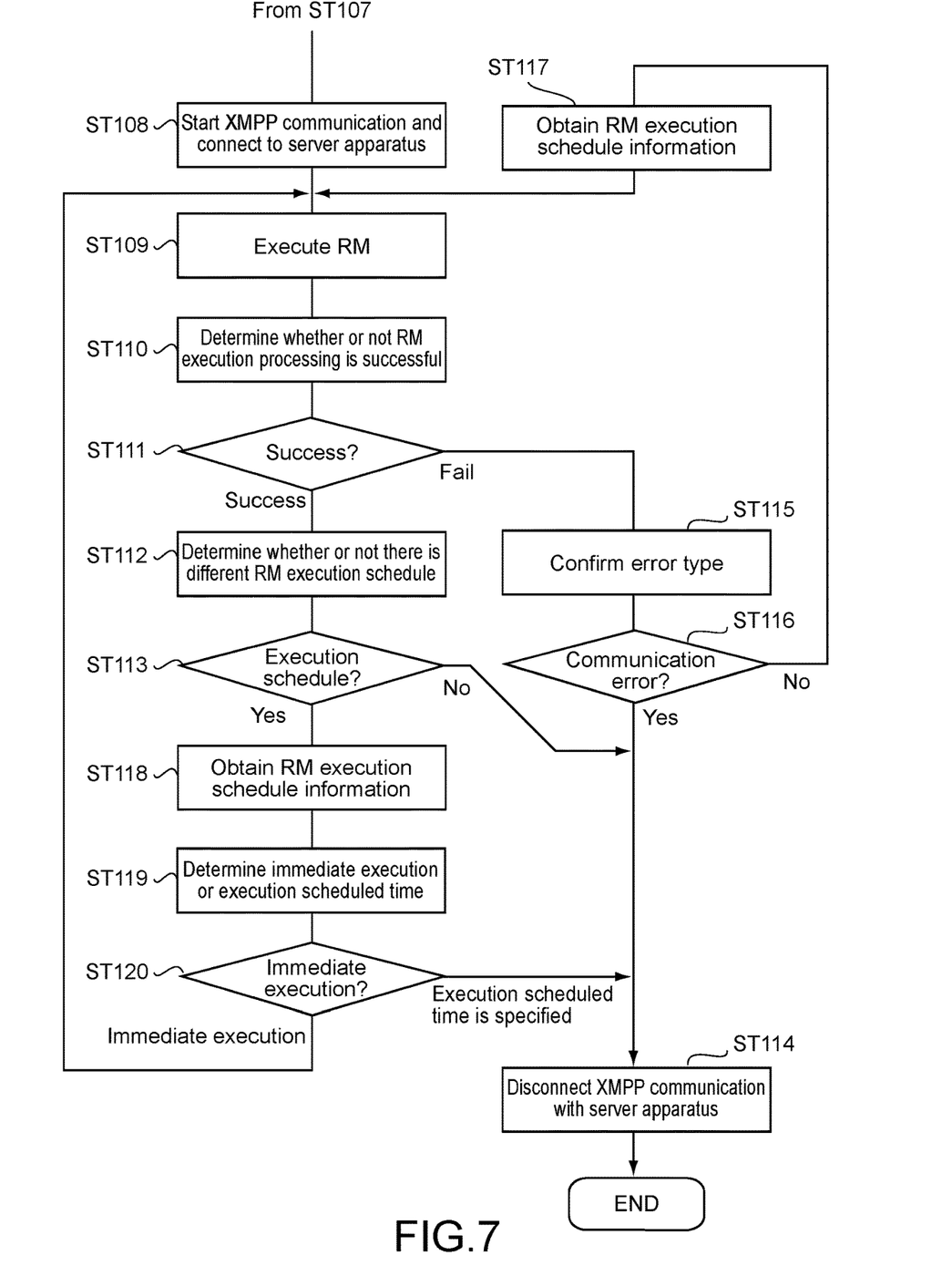
FIG. 7 shows an operational flow of the electronic apparatus.

FIG. 6 and FIG. 7 show operational flows of the electronic apparatus.

The device status notification module 101 of the controller circuit 100 notifies the server apparatus 20 of the device status such as the number of sheets used by the electronic apparatus 10 or toner levels via the HTTP communication at regular intervals (Step ST101). The device status notification module 101 controls the network communication interface 13 to send information indicating the device status to the server apparatus 20 by using Post method or the like.

Subsequently, the first remote maintenance execution schedule information obtaining module 102 of the controller circuit 100 determines whether or not there is execution-scheduled remote maintenance (Step ST102).

For example, the first remote maintenance execution schedule information obtaining module 102 determines as follows. The first remote maintenance execution schedule information obtaining module 102 sends an inquiry whether or not the server apparatus 20 has remote maintenance execution schedule. If the server apparatus 20 returns information indicating that the server apparatus 20 has execution schedule, the first remote maintenance execution schedule information obtaining module 102 determines that there is remote maintenance execution schedule. If not, the first remote maintenance execution schedule information obtaining module 102 determines that there is no remote maintenance execution schedule.

Subsequently, if the server apparatus 20 has execution schedule (Step ST103, Yes), the first remote maintenance execution schedule information obtaining module 102 of the controller circuit 100 obtains remote maintenance execution schedule information (Step ST104). Meanwhile, if the server apparatus 20 has no execution schedule (Step ST103, No), the first remote maintenance execution schedule information obtaining module 102 confirms the next device status notification (return to Step ST101).

Subsequently, the remote maintenance execution processing module 103 of the controller circuit 100 determines whether or not execution-scheduled remote maintenance is to be "immediately executed" based on execution schedule information obtained from the server apparatus 20 (Step ST105).

For example, the remote maintenance execution processing module 103 determines as follows. The remote maintenance execution processing module 103 determines whether or not the immediate execution flag 2053 of execution schedule information of the execution-scheduled remote maintenance is ON. If the immediate execution flag 2053 is ON, the remote maintenance execution processing module 103 determines that the execution-scheduled remote maintenance is to be "immediately executed". Alternatively, the remote maintenance execution processing module 103 may determine whether or not the execution scheduled time 2052 is specified, and may determine that the execution-scheduled remote maintenance is not to be "immediately executed" if the execution scheduled time 2052 is specified.

If the execution-scheduled remote maintenance is not to be "immediately executed" (Step ST106, execution scheduled time is specified), the remote maintenance execution processing module 103 stands by until the execution scheduled time (Step ST107). Meanwhile, if the execution-scheduled remote maintenance is to be "immediately executed" (Step ST106, immediate execution), the remote maintenance execution processing module 103 does not stand by and subsequently executes remote maintenance.

In the aforementioned processing, communication between the electronic apparatus 10 and the server apparatus 20 is executed based on HTTP. The first remote maintenance execution schedule information obtaining module 102 obtains information of presence or absence of remote maintenance execution schedule and execution schedule information based on the HTTP communication.

In the following processing, communication between the electronic apparatus 10 and the server apparatus 20 is executed based on XMPP. The electronic apparatus 10 sends and receives information to and from the server apparatus 20 based on XMPP.

The remote maintenance execution processing module 103 starts the XMPP communication and connects to the server apparatus 20 where immediate execution is specified when the remote maintenance execution scheduled time arrives (Step ST108). Since XMPP is a continuous connection protocol, the session between the electronic apparatus 10 and the server apparatus 20 is maintained in principle where there is no explicit disconnection or timeout.

Subsequently, the remote maintenance execution processing module 103 sends and receives files and data to and from the server apparatus 20 based on the XMPP communication, and executes remote maintenance (Step ST109). The remote maintenance includes, for example, firmware upgrade execution, and execution of various programs in the maintenance mode. For example, the remote maintenance execution processing module 103 sends firmware upgrade request information to the server apparatus 20 based on the XMPP communication. In reply, the server apparatus 20 sends files and data to the electronic apparatus 10.

Subsequently, the remote maintenance execution processing module 103 determines whether or not the remote maintenance execution processing is successful (Step ST110). A case where the remote maintenance execution processing is not successful (failed) will be described later. In the following, the process where the remote maintenance execution processing is successful will be described.

If the remote maintenance execution processing is successful (Step ST111, success), the second remote maintenance execution schedule information obtaining module 104 of the controller circuit 100 determines whether or not there is unexecuted remote maintenance execution schedule, which is to be executed by the electronic apparatus 10, in addition to the remote maintenance executed in Step ST109 (Step ST112).

For example, the second remote maintenance execution schedule information obtaining module 104 determines as follows. The second remote maintenance execution schedule information obtaining module 104 sends an inquiry whether or not the server apparatus 20 has different remote maintenance execution schedule. If the server apparatus 20 returns information indicating that the server apparatus 20 has different execution schedule, the second remote maintenance execution schedule information obtaining module 104 determines that there is different remote maintenance execution schedule. If not, the second remote maintenance execution schedule information obtaining module 104 determines that there is no different remote maintenance execution schedule. Note that Step ST112 is different from Step ST102 in which the first remote maintenance execution schedule information obtaining module 102 sends an inquiry to the server apparatus 20 based on the HTTP communication. In Step ST112, the second remote maintenance execution schedule information obtaining module 104 sends an inquiry to the server apparatus 20 based on the XMPP communication.

A case where there is different remote maintenance execution schedule will be described later. In the following, the process where there is no different remote maintenance execution schedule will be described. In this case (Step ST113, No), the controller circuit 100 disconnects the XMPP communication with the server apparatus 20, which has been connected from Step ST108, (Step ST114), and finishes the process.

If the remote maintenance execution processing is failed (Step ST111, fail), the remote maintenance execution processing module 103 confirms the error type (Step ST115). If the error type is a communication error (Step ST116, Yes), the controller circuit 100 disconnects the XMPP communication with the server apparatus 20, which has been connected from Step ST108, (Step ST114), and finishes the process.

Meanwhile, if the error type is not a communication error (Step ST116, No), the second remote maintenance execution schedule information obtaining module 104 re-obtains remote maintenance execution schedule information, execution processing of which was failed, from the server apparatus 20 based on the XMPP communication in connection (Step ST117).

If the remote maintenance is successful and there is different remote maintenance execution schedule (Step ST113, Yes), the second remote maintenance execution schedule information obtaining module 104 obtains remote maintenance execution schedule information from the server apparatus 20 (Step ST118).

Subsequently, the remote maintenance execution processing module 103 of the controller circuit 100 determines whether or not execution-scheduled remote maintenance is to be "immediately executed" based on execution schedule information obtained from the server apparatus 20 (Step ST119).

For example, the remote maintenance execution processing module 103 determines as follows. The remote maintenance execution processing module 103 determines whether or not the immediate execution flag 2053 of execution schedule information of the execution-scheduled remote maintenance is ON. If the immediate execution flag 2053 is ON, the remote maintenance execution processing module 103 determines that the execution-scheduled remote maintenance is to be "immediately executed". Alternatively, the remote maintenance execution processing module 103 may determine whether or not the execution scheduled time 2052 is specified, and may determine that the execution-scheduled remote maintenance is not to be "immediately executed" if the execution scheduled time 2052 is specified.

If the execution-scheduled remote maintenance is not to be "immediately executed" (Step ST120, execution scheduled time is specified), the controller circuit 100 disconnects the XMPP communication with the server apparatus 20, which has been connected from Step ST108, (Step ST114), and finishes the process. In this case, the controller circuit 100 starts the XMPP communication at the execution scheduled time, which is included in the next remote maintenance execution schedule information obtained in Step ST118, and connects to the server apparatus 20. In short, the controller circuit 100 starts processing from Step ST108 at the aforementioned execution scheduled time.

Meanwhile, if the execution-scheduled remote maintenance is to be "immediately executed" (Step ST120, immediate execution), the remote maintenance execution processing module 103 does not stand by and subsequently executes the next remote maintenance (return to Step ST109).

7. OPERATION OF SERVER APPARATUS

Figure 8:
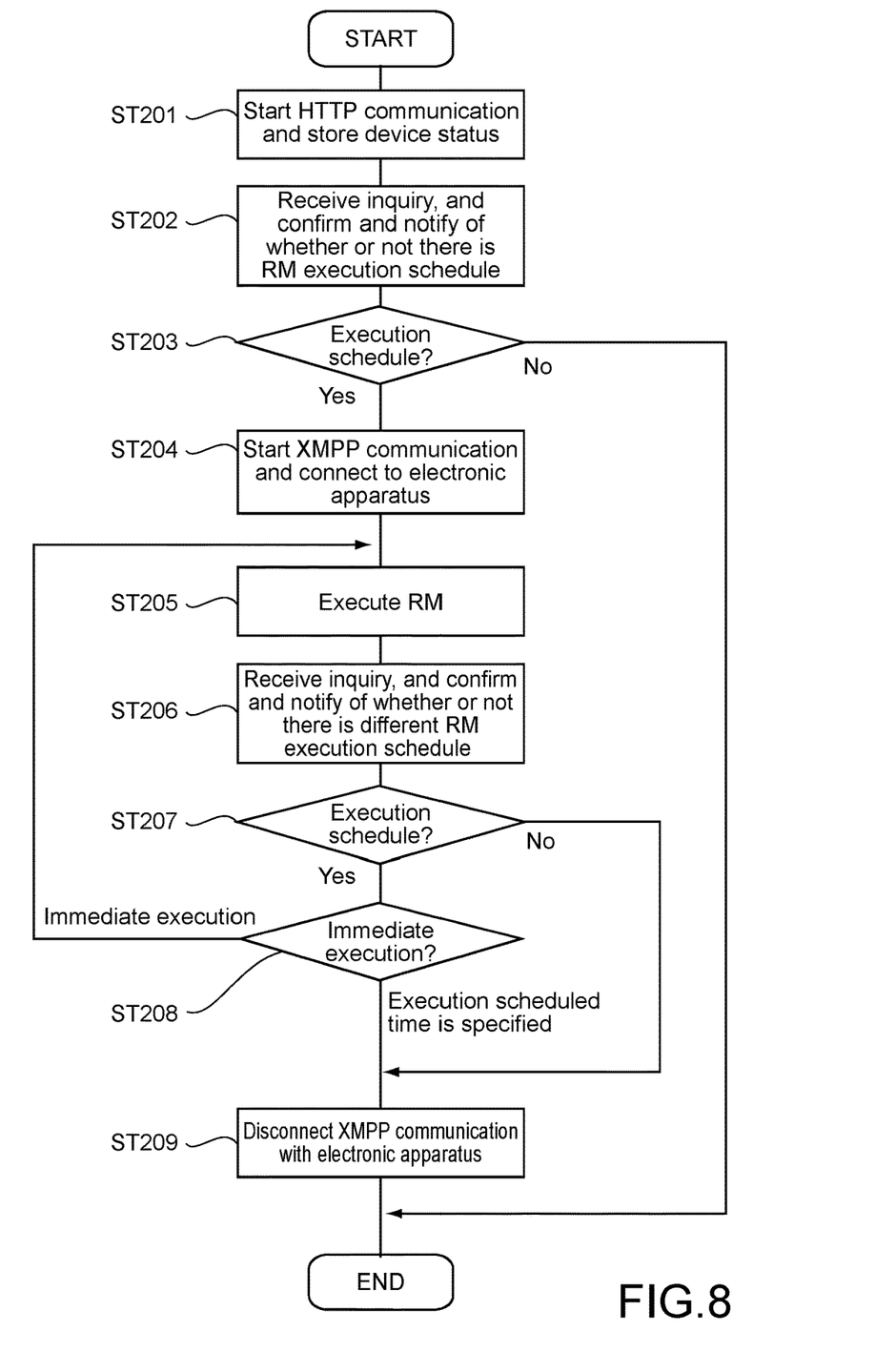
FIG. 8 shows an operational flow of the server apparatus.

FIG. 8 shows an operational flow of the server apparatus.

The device status storing module 201 of the controller circuit 200 receives information indicating the device status from the electronic apparatus 10 via the HTTP communication, and then stores the information indicating the device status (Step ST201).

Step ST201 corresponds to Step ST101 of the operational flow of the electronic apparatus 10.

Subsequently, the first remote maintenance execution schedule information notification module 202 of the controller circuit 200 receives an inquiry from the electronic apparatus 10 based on the HTTP communication, confirms whether or not there is remote maintenance execution schedule, and notifies the electronic apparatus 10 of whether or not there is remote maintenance execution schedule (Step ST202). If the remote maintenance execution schedule information storing module 205 stores remote maintenance execution schedule information, the first remote maintenance execution schedule information notification module 202 sends the remote maintenance execution schedule information to the electronic apparatus 10 at the time of notification.

Step ST202 corresponds to Step ST102 and Step ST104 of the operational flow of the electronic apparatus 10.

If the remote maintenance execution schedule information storing module 205 does not store remote maintenance execution schedule information and there is no execution schedule (Step ST203, No), the operational flow of the server apparatus 20 is finished.

If the remote maintenance execution schedule information storing module 205 stores remote maintenance execution schedule information and there is remote maintenance execution schedule (Step ST203, Yes), after that, when the server apparatus 20 receives an XMPP communication connection request from the remote maintenance execution processing module 103 of the electronic apparatus 10, the remote maintenance execution processing module 203 of the server apparatus 20 starts the XMPP communication and connects to the electronic apparatus 10 (Step ST204).

Step ST204 corresponds to Step ST108 of the operational flow of the electronic apparatus 10.

Subsequently, the remote maintenance execution processing module 203 of the server apparatus 20 executes remote maintenance based on the XMPP communication while maintaining the connection via the XMPP communication with the remote maintenance execution processing module 103 of the electronic apparatus 10 (Step ST205).

Step ST205 corresponds to Step ST109 of the operational flow of the electronic apparatus 10.

Subsequently, the second remote maintenance execution schedule information notification module 204 of the server apparatus 20 receives an inquiry to confirm whether or not there is different remote maintenance execution schedule from the electronic apparatus 10, and notifies the electronic apparatus 10 of whether or not there is different remote maintenance execution schedule (Step ST206). Similar to Step ST202 of the first remote maintenance execution schedule information notification module 202, if the remote maintenance execution schedule information storing module 205 stores remote maintenance execution schedule information, the second remote maintenance execution schedule information notification module 204 sends the remote maintenance execution schedule information to the electronic apparatus 10 at the time of notification. If not, the second remote maintenance execution schedule information notification module 204 notifies the electronic apparatus 10 that there is no remote execution schedule.

Step ST206 corresponds to Step ST118 of the operational flow of the electronic apparatus 10.

If the remote maintenance execution schedule information storing module 205 does not store different remote maintenance execution schedule information and there is no execution schedule (Step ST207, No), the operational flow of the server apparatus 20 is finished. The controller circuit 200 disconnects the XMPP communication with the electronic apparatus 10 (Step ST209).

If the remote maintenance execution schedule information storing module 205 stores different remote maintenance execution schedule information and there is different remote maintenance execution schedule (Step ST207, Yes), the second remote maintenance execution schedule information notification module 204 determines whether or not the remote maintenance is to be immediately executed based on whether or not execution schedule information includes immediate execution information (Step ST208).

If the different remote maintenance execution schedule information includes the immediate execution information (Step ST208, immediate execution), Subsequently, the remote maintenance execution processing module 203 of the server apparatus 20 executes remote maintenance based on the XMPP communication while maintaining the connection via the XMPP communication with the remote maintenance execution processing module 103 of the electronic apparatus 10 (return to Step ST205).

If the different remote maintenance execution schedule information includes no immediate execution information and the execution scheduled time is specified (Step ST208, execution scheduled time is specified), the operational flow of the server apparatus 20 is finished. The controller circuit 200 disconnects the XMPP communication with the electronic apparatus 10 (Step ST209).

Step ST209 corresponds to Step ST114 of the operational flow of the electronic apparatus 10.

8. MODIFICATION EXAMPLES

In the present embodiment, the first remote maintenance execution schedule information obtaining module 102 of the controller circuit 100 determines whether or not there is execution-scheduled remote maintenance (Step ST102). After that, if there is execution schedule, the first remote maintenance execution schedule information obtaining module 102 obtains the remote maintenance execution schedule information (Step ST104). Alternatively, the first remote maintenance execution schedule information obtaining module 102 may be configured to firstly obtain remote maintenance execution schedule information, determine that there is execution schedule if obtained, and determine that there is no execution schedule if not.

For example, the first remote maintenance execution schedule information obtaining module 102 determines as follows. The first remote maintenance execution schedule information obtaining module 102 requests the server apparatus 20 to send remote maintenance execution schedule information. If the server apparatus 20 returns execution schedule information, the first remote maintenance execution schedule information obtaining module 102 determines that there is remote maintenance execution schedule. In other cases including a case where the server apparatus 20 returns no execution schedule information, the first remote maintenance execution schedule information obtaining module 102 determines that there is no remote maintenance execution schedule.

In the present embodiment, the second remote maintenance execution schedule information obtaining module 104 of the controller circuit 100 determines whether or not there is different remote maintenance execution schedule (Step ST112). After that, if there is execution schedule, the second remote maintenance execution schedule information obtaining module 104 obtains the different remote maintenance execution schedule information (Step ST118). Similar to the aforementioned modification example, alternatively, the second remote maintenance execution schedule information obtaining module 104 may be configured to firstly obtain remote maintenance execution schedule information, determine that there is execution schedule if obtained, and determine that there is no execution schedule if not.

In the present embodiment, in Step ST108, the remote maintenance execution processing module 103 of the controller circuit 100 starts the XMPP communication at the time indicated by the execution scheduled time 2052, and connects to the server apparatus 20. If there is no connection via the XMPP communication from the electronic apparatus 10 for remote maintenance until the time indicated by the execution scheduled time 2052, the controller circuit 200 of the server apparatus 20 may determine that remote maintenance is failed in an unexecuted status. Further, similarly, if there is no connection (including HTTP communication and XMPP communication) from the electronic apparatus 10 for remote maintenance until the time indicated by the execution scheduled time 2052, the controller circuit 200 of the server apparatus 20 may determine that remote maintenance is failed in an unexecuted status. According to this configuration, it is possible to easily list electronic apparatuses 10, for each of which important remote maintenance (e.g., firmware upgrade) is not executed until the time indicated by the execution scheduled time 2052. So such electronic apparatuses 10 may be managed easily.

9. CONCLUSION

In a typical remote maintenance system, HTTP (Hyper Text Transfer Protocol) is used for communication between a server apparatus, which remotely maintains an electronic apparatus, and the electronic apparatus. In a remote maintenance system, not only the HTTP communication protocol but also another communication protocol such as XMPP (Extensible Messaging and Presence Protocol) may be used for remote maintenance in view of various merits.

However, in some cases, an electronic apparatus may be configured not to use another communication protocol in principle to reduce a communication data volume, for example. In this case, the electronic apparatus is not capable of executing remote maintenance via communication based on the other communication protocol with the server apparatus.

(1) To the contrary, according to the present embodiment, the electronic apparatus 10 starts communication with the server apparatus 20 based on HTTP, and confirms whether or not the server apparatus 20 has a schedule of execution of remote maintenance in the communication session, and if the electronic apparatus 10 receives remote maintenance execution schedule information from the server apparatus 20, starts communication with the server apparatus 20 based on XMPP. As a result, even in a monitor mode in which the XMPP communication is disconnected, the electronic apparatus 10 is capable of executing remote maintenance. In other words, in a remote maintenance system that uses two or more communication protocols, an electronic apparatus, which is configured not to use another communication protocol different from one communication protocol in principle, is capable of executing remote maintenance via the other communication protocol. Further, since the electronic apparatus 10 does not continuously connect to the XMPP communication, a communication data volume may be reduced.

(2) According to the present embodiment, if execution schedule information includes remote maintenance execution scheduled time, the electronic apparatus 10 establishes the XMPP communication with the server apparatus 20 at the execution scheduled time. As a result, the electronic apparatus 10 is capable of executing remote maintenance at the specified execution scheduled time.

(3) According to the present embodiment, if execution schedule information includes remote maintenance immediate execution request information, the electronic apparatus 10 establishes the XMPP communication subsequently to the HTTP communication. As a result, the electronic apparatus 10 is capable of immediately executing remote maintenance.

(4) According to the present embodiment, after execution of remote maintenance, the electronic apparatus 10 sends an inquiry to confirm whether or not the server apparatus 20 has a different remote maintenance execution schedule via the XMPP communication without disconnecting the XMPP communication. As a result, the electronic apparatus 10 is capable of confirming whether or not there is the next remote maintenance while reducing the communication data volume.

(5) According to the present embodiment, if there is the different remote maintenance execution schedule and immediate execution is specified, the electronic apparatus 10 executes the different remote maintenance via the XMPP communication without disconnecting the XMPP communication. Meanwhile, if execution scheduled time is specified, the electronic apparatus 10 once disconnects the XMPP communication, and after that, establishes the XMPP communication at the specified execution scheduled time to execute the different remote maintenance. As a result, the electronic apparatus 10 is capable of executing the next remote maintenance while reducing the communication data volume.

(6) According to the present embodiment, if remote maintenance execution processing is failed for some reasons, the electronic apparatus 10 re-obtains the remote maintenance execution schedule information from the server apparatus 20 via the XMPP communication without disconnecting the XMPP communication. As a result, even if remote maintenance execution processing is failed, the electronic apparatus 10 is capable of re-obtaining remote maintenance execution schedule information again while reducing the communication data volume.

(7) According to the present embodiment, if remote maintenance execution processing is failed because of a communication error, the electronic apparatus 10 disconnects the XMPP communication. As a result, the electronic apparatus 10 does not need to try remote maintenance again and again in an unstable communication environment. As a result, communication data volume may be reduced.

It should be understood by those skilled in the art that various modifications, combinations, sub-combinations and alterations may occur depending on design requirements and different factors insofar as they are within the scope of the appended claims or the equivalents thereof.

What is claimed is:

1. An electronic apparatus, comprising:
a communication interface configured to communicate with a server apparatus based on one of a first communication protocol and a second communication protocol; and
a controller circuit configured to
control the communication interface to start communication with the server apparatus based on the first communication protocol, and to confirm whether or not the server apparatus has a schedule of execution of remote maintenance after start of the communication,
if the communication interface receives remote maintenance execution schedule information from the server apparatus, control the communication interface to start communication with the server apparatus based on the second communication protocol,
execute the remote maintenance based on information received from the server apparatus via the communication based on the second communication protocol,
after execution of the remote maintenance, control the communication interface to confirm whether or not the server apparatus has a schedule of execution of different remote maintenance via the communication based on the second communication protocol without disconnecting the communication with the server apparatus based on the second communication protocol, if the communication interface receives different remote maintenance execution schedule information from the server apparatus and the different remote maintenance execution schedule information includes immediate execution request information, execute the different remote maintenance based on information received from the server apparatus via the communication based on the second communication protocol without disconnecting the communication with the server apparatus based on the second communication protocol, and if the different remote maintenance execution schedule information specifies execution scheduled time, control the communication interface to disconnect the communication with the server apparatus based on the second communication protocol, and to start communication with the server apparatus based on the second communication protocol at the execution scheduled time for the different remote maintenance.

2. The electronic apparatus according to claim 1, wherein the controller circuit is configured to if the communication interface receives the execution schedule information including remote maintenance execution scheduled time from the server apparatus, control the communication interface to start communication with the server apparatus based on the second communication protocol at the execution scheduled time.

3. The electronic apparatus according to claim 1, wherein the controller circuit is configured to if the communication interface receives the execution schedule information including remote maintenance immediate execution request information from the server apparatus, control the communication interface to subsequently start communication with the server apparatus based on the second communication protocol after the communication based on the first communication protocol is finished.

4. The electronic apparatus according to claim 1, wherein the controller circuit is configured to if the remote maintenance execution processing is failed, control the communication interface to re-obtain the execution schedule information via the communication based on the second communication protocol without disconnecting the communication with the server apparatus based on the second communication protocol, and re-execute the remote maintenance based on the re-obtained execution schedule information via the communication based on the second communication protocol without disconnecting the communication with the server apparatus based on the second communication protocol.

5. The electronic apparatus according to claim 1, wherein the controller circuit is configured to if the remote maintenance execution processing is failed because of a communication error, control the communication interface to disconnect the communication with the server apparatus based on the second communication protocol.

6. A method of controlling an electronic apparatus, comprising:

controlling a communication interface to start communication with a server apparatus based on a first communication protocol, and to confirm whether or not the server apparatus has a schedule of execution of remote maintenance after start of the communication;

if the communication interface receives remote maintenance execution schedule information from the server apparatus, controlling the communication interface to start communication with the server apparatus based on a second communication protocol;

executing the remote maintenance based on information received from the server apparatus via the communication based on the second communication protocol;

after execution of the remote maintenance, controlling the communication interface to confirm whether or not the server apparatus has a schedule of execution of different remote maintenance via the communication based on the second communication protocol without disconnecting the communication with the server apparatus based on the second communication protocol;

if the communication interface receives different remote maintenance execution schedule information from the server apparatus and the different remote maintenance execution schedule information includes immediate execution request information, executing the different remote maintenance based on information received from the server apparatus via the communication based on the second communication protocol without disconnecting the communication with the server apparatus based on the second communication protocol; and if the different remote maintenance execution schedule information specifies execution scheduled time, controlling the communication interface to disconnect the communication with the server apparatus based on the second communication protocol, and to start communication with the server apparatus based on the second communication protocol at the execution scheduled time for the different remote maintenance.

7. A non-transitory computer readable recording medium that records a controller program executable by a controller circuit of an electronic apparatus including a communication interface and the controller circuit, the controller program causing the controller circuit of the electronic apparatus to:

control the communication interface to start communication with a server apparatus based on a first communication protocol, and to confirm whether or not the server apparatus has a schedule of execution of remote maintenance after start of the communication;

if the communication interface receives remote maintenance execution schedule information from the server apparatus, control the communication interface to start communication with the server apparatus based on a second communication protocol;

execute the remote maintenance based on information received from the server apparatus via the communication based on the second communication protocol;

after execution of the remote maintenance, control the communication interface to confirm whether or not the server apparatus has a schedule of execution of different remote maintenance via the communication based on the second communication protocol without disconnecting the communication with the server apparatus based on the second communication protocol;

if the communication interface receives different remote maintenance execution schedule information from the server apparatus and the different remote maintenance execution schedule information includes immediate execution request information, execute the different remote maintenance based on information received from the server apparatus via the communication based on the second communication protocol without disconnecting the communication with the server apparatus based on the second communication protocol; and if the different remote maintenance execution schedule information specifies execution scheduled time, control the communication interface to disconnect the communication with the server apparatus based on the second communication protocol, and to start communication with the server apparatus based on the second communication protocol at the execution scheduled time for the different remote maintenance.

* * * * *